US009333832B2

(12) United States Patent
Burns et al.

(10) Patent No.: US 9,333,832 B2
(45) Date of Patent: May 10, 2016

(54) SYSTEM AND METHOD FOR PROVIDING AN AIR CONDITIONER EFFICIENCY CONTROL FOR A VEHICLE

(71) Applicant: Honda Motor Co., Ltd., Tokyo (JP)

(72) Inventors: Trevor Burns, Milford Center, OH (US); Derek Scott Adelman, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 29 days.

(21) Appl. No.: 14/247,778

(22) Filed: Apr. 8, 2014

(65) Prior Publication Data
US 2015/0283871 A1 Oct. 8, 2015

(51) Int. Cl.
*B60H 1/00* (2006.01)
*B60H 1/32* (2006.01)
*F25D 16/00* (2006.01)

(52) U.S. Cl.
CPC .............. *B60H 1/005* (2013.01); *B60H 1/323* (2013.01); *B60H 2001/327* (2013.01); *B60H 2001/3266* (2013.01); *B60H 2001/3273* (2013.01); *B60Y 2306/05* (2013.01); *F25B 2400/24* (2013.01); *F25D 16/00* (2013.01)

(58) Field of Classification Search
None
See application file for complete search history.

(56) References Cited

U.S. PATENT DOCUMENTS

| | | | |
|---|---|---|---|
| 6,330,909 B1 * | 12/2001 | Takahashi | B60H 1/005 165/202 |
| 6,606,877 B2 * | 8/2003 | Tomita | B60H 1/005 165/10 |
| 6,688,120 B2 | 2/2004 | Aoki et al. | |
| 6,691,522 B1 | 2/2004 | Kojima | |
| 6,715,303 B2 | 4/2004 | Masuda et al. | |
| 6,820,436 B2 | 11/2004 | Tomita et al. | |
| 6,854,513 B2 | 2/2005 | Shirota et al. | |
| 6,981,544 B2 * | 1/2006 | Iwanami et al. | 165/202 |
| 7,100,383 B2 | 9/2006 | Sugesawa et al. | |
| 7,143,604 B2 * | 12/2006 | Bureau | F28D 1/05366 62/430 |
| 7,861,547 B2 * | 1/2011 | Major | B60H 1/005 62/201 |
| 2003/0070800 A1 * | 4/2003 | Ito et al. | 165/271 |
| 2006/0259219 A1 * | 11/2006 | Wakiyama et al. | 701/36 |
| 2010/0161198 A1 * | 6/2010 | Kuwahara et al. | 701/102 |
| 2012/0060522 A1 * | 3/2012 | Markowitz et al. | 62/79 |
| 2012/0123627 A1 * | 5/2012 | Sourioux | B60H 1/004 702/22 |
| 2012/0253587 A1 * | 10/2012 | Davidson | 701/29.3 |
| 2012/0304670 A1 * | 12/2012 | Kumar | F25B 27/00 62/61 |
| 2013/0261942 A1 * | 10/2013 | McQuade et al. | 701/115 |

FOREIGN PATENT DOCUMENTS

| | | |
|---|---|---|
| EP | 2191990 | 6/2010 |
| JP | 5098490 | 2/2009 |

* cited by examiner

*Primary Examiner* — James Trammell
*Assistant Examiner* — Demetra Smith-Stewart
(74) *Attorney, Agent, or Firm* — Rankin, Hill & Clark LLP

(57) ABSTRACT

A system and method for providing an air conditioning compressor efficiency in a vehicle. The method and system includes determining one or more vehicle driving scores based on one or more vehicle driving factors. The system and method additionally includes predicting when the vehicle will be put into the vehicle idle stop state based on the one or more vehicle driving scores and providing air conditioning during a plurality of vehicle operating states. The providing of air conditioning during a plurality of vehicle operating states includes disabling an air conditioner compressor and providing cooling to a vehicle cabin from a cold storage evaporator when the vehicle is put into the vehicle idle stop state and continuing to provide cooling from the cold storage evaporator when the vehicle operating state changes from the vehicle idle stop state to an engine enabled state.

19 Claims, 10 Drawing Sheets

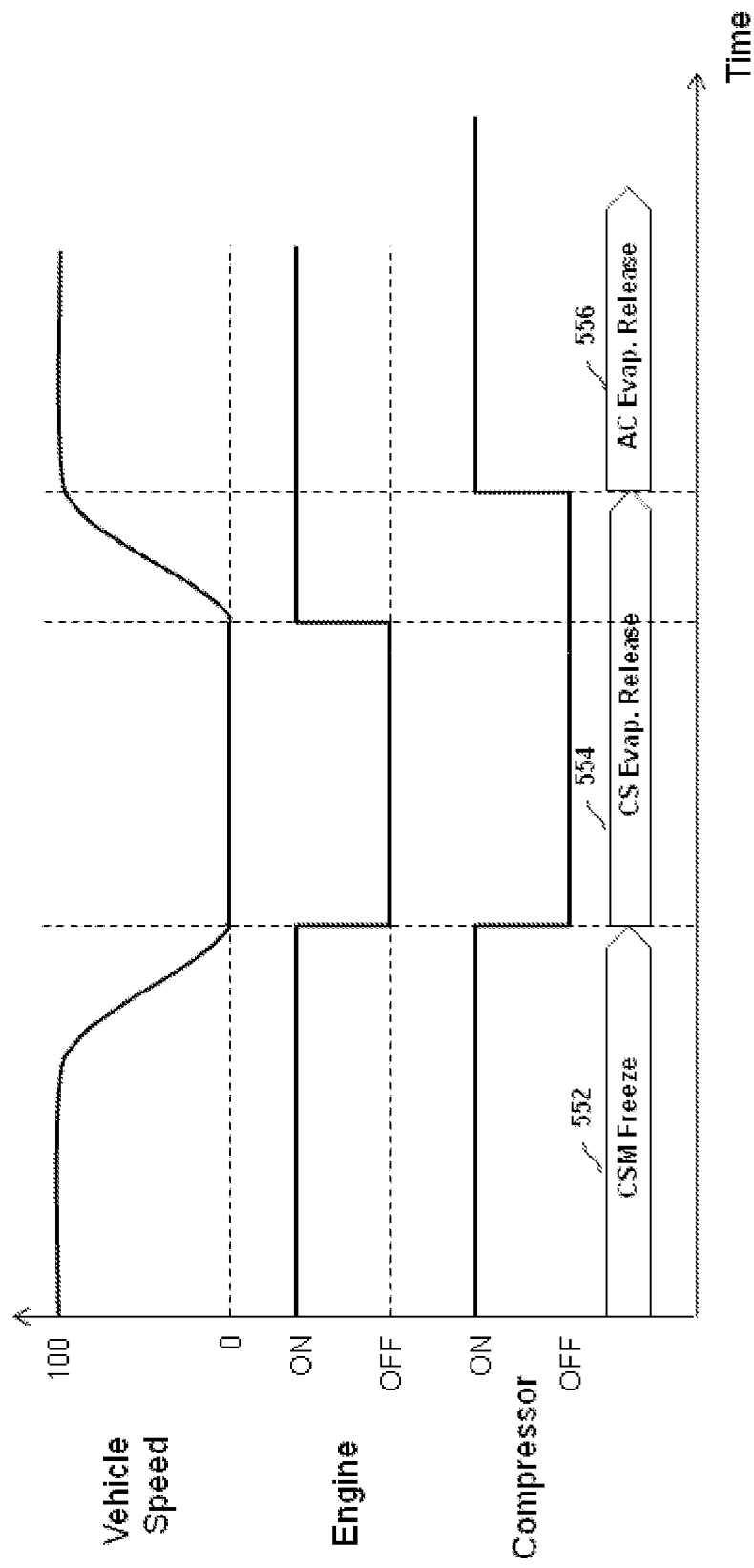

SYSTEM AND METHOD FOR PROVIDING AN AIR CONDITIONER EFFICIENCY CONTROL FOR A VEHICLE

BACKGROUND

Many vehicle manufacturers have utilized a large amount of resources to design more fuel efficient vehicles. In many cases, manufacturers have tweaked vehicle engine performance or designed different types of engines to ensure that vehicle engines run more efficiently. In some cases hybrid electric technology has been utilized to enable the vehicle to use two power sources that in most cases consist of a battery powered electrical source and a gasoline source. Many hybrid vehicles and some non hybrid vehicles are designed with the battery powered electrical source to serve as part of an idle-stop system that disables the gasoline engine when the vehicle is at rest, and in some cases when the vehicle is coasting or slowing down. The idle-stop system causes vehicles to be more fuel efficient as fuel is saved and not burned inside the engine since the engine is disabled (i.e., turned off) when the vehicle is in the idle-stop state.

In addition to tweaking engine performance, another key factor that has influenced fuel consumption within vehicles is the performance of the air conditioning system. In traditional air conditioning systems, the air conditioning compressor is driven by a belt assembly connected with the vehicle engine in order to feed compressed fluid to an evaporator, which cools air passing over the evaporator. In order to keep up with the demand of the vehicle cabin temperature requirements, the compressor is utilized as long as the vehicle is enabled. Consequently, as the air conditioning system is utilized, the engine is required to perform at higher levels causing more fuel to be consumed. The high level of fuel consumption is inconsistent with the goals of increasing fuel efficiency as the traditional air conditioning system can not be utilized with vehicles that include the idle-stop system.

For example, when the vehicle is in the idle-stop state the air conditioner compressor is also disabled (since the engine is disabled) resulting in no compressed fluid to be fed to the evaporator. Accordingly, temperature in the evaporator increases and the demand of the vehicle cabin temperature requirements can not be met. In many cases, the air conditioning system needs to make up for the deficiency in regards to the cabin temperature requirements that is caused when the vehicle was disabled during the idle-stop state. Consequently, the engine is required to perform at higher levels causing an even greater amount of fuel to be consumed which undermines the ultimate goal of producing a more fuel efficient vehicle with the idle-stop system.

SUMMARY

According to one aspect, a method for providing an air conditioning compressor efficiency control for a vehicle. The method includes determining one or more vehicle factors based on one or more vehicle driving factors. The method further includes predicting when the vehicle will be put into the vehicle idle stop state based on the one or more vehicle driving scores including a vehicle cruise control actuation score that is a summation of the cruise control signal actuation over the course of a predetermined amount of time. The method further includes providing air conditioning during a plurality of vehicle operating states during at least one of: an engine enabled state and a vehicle idle stop state based on the prediction of when the vehicle will be put into the vehicle idle stop state. The providing of air conditioning during a plurality of vehicle operating states includes disabling an air conditioner compressor and providing cooling to the vehicle cabin from a cold storage evaporator when the vehicle operating state is the vehicle idle stop state and continuing to provide cooling to the vehicle cabin from the cold storage evaporator when the vehicle operating state changes from the vehicle idle stop state to the engine enabled state until a sufficient amount of cold storage material becomes unfrozen.

According to a further aspect, a system for providing an air conditioning compressor efficiency control for a vehicle is provided. Specifically, in accordance with this aspect, the system includes a plurality of modules including a cruise control module for determining one or more driving scores based on one or more vehicle driving factors. The system also includes a vehicle idle prediction component for predicting when the vehicle will be put into a vehicle idle stop state based on one or more vehicle driving scores including a vehicle cruise control actuation score determined by the cruise control module that is a rolling summation of the cruise control actuation score over a course of a predetermined amount of time. The system further includes an air conditioner control unit that enables air conditioning to be provided during at least one of an engine enabled state and a vehicle idle stop state. The air conditioner control unit disables an air conditioner compressor and provides cooling to a vehicle cabin from a cold storage evaporator when the vehicle operating state is the vehicle idle stop state and continues to provide cooling to the vehicle cabin from the cold storage evaporator when the vehicle operating state changes from the vehicle idle stop state to the engine enabled state until a sufficient amount of cold storage material becomes unfrozen.

According to still another aspect, a computer readable medium comprising instructions that when executed by a processor execute a method for providing air conditioning compressor efficiency control for a vehicle. The method includes determining one or more vehicle factors based on one or more vehicle driving factors. The method further includes predicting when the vehicle will be put into the vehicle idle stop state based on the one or more vehicle driving scores including a vehicle cruise control actuation score that is a summation of the cruise control signal actuation over the course of a predetermined amount of time. The method further includes providing air conditioning during a plurality of vehicle operating states during at least one of: an engine enabled state and a vehicle idle stop state based on the prediction of when the vehicle will be put into the vehicle idle stop state. The providing air conditioning during a plurality of vehicle operating states includes disabling an air conditioner compressor and providing cooling to the vehicle cabin from a cold storage evaporator when the vehicle operating state is the vehicle idle stop state and continuing to provide cooling to the vehicle cabin from the cold storage evaporator when the vehicle operating state changes from the vehicle idle stop state to the engine enabled state until a sufficient amount of cold storage material becomes unfrozen.

BRIEF DESCRIPTION OF THE DRAWINGS

FIG. 5B is a graph for depicting an illustrative example of cold storage release and vehicle evaporator release points according to the method utilized by the exemplary embodiment in FIG. 5A.

DETAILED DESCRIPTION

Figure 1:
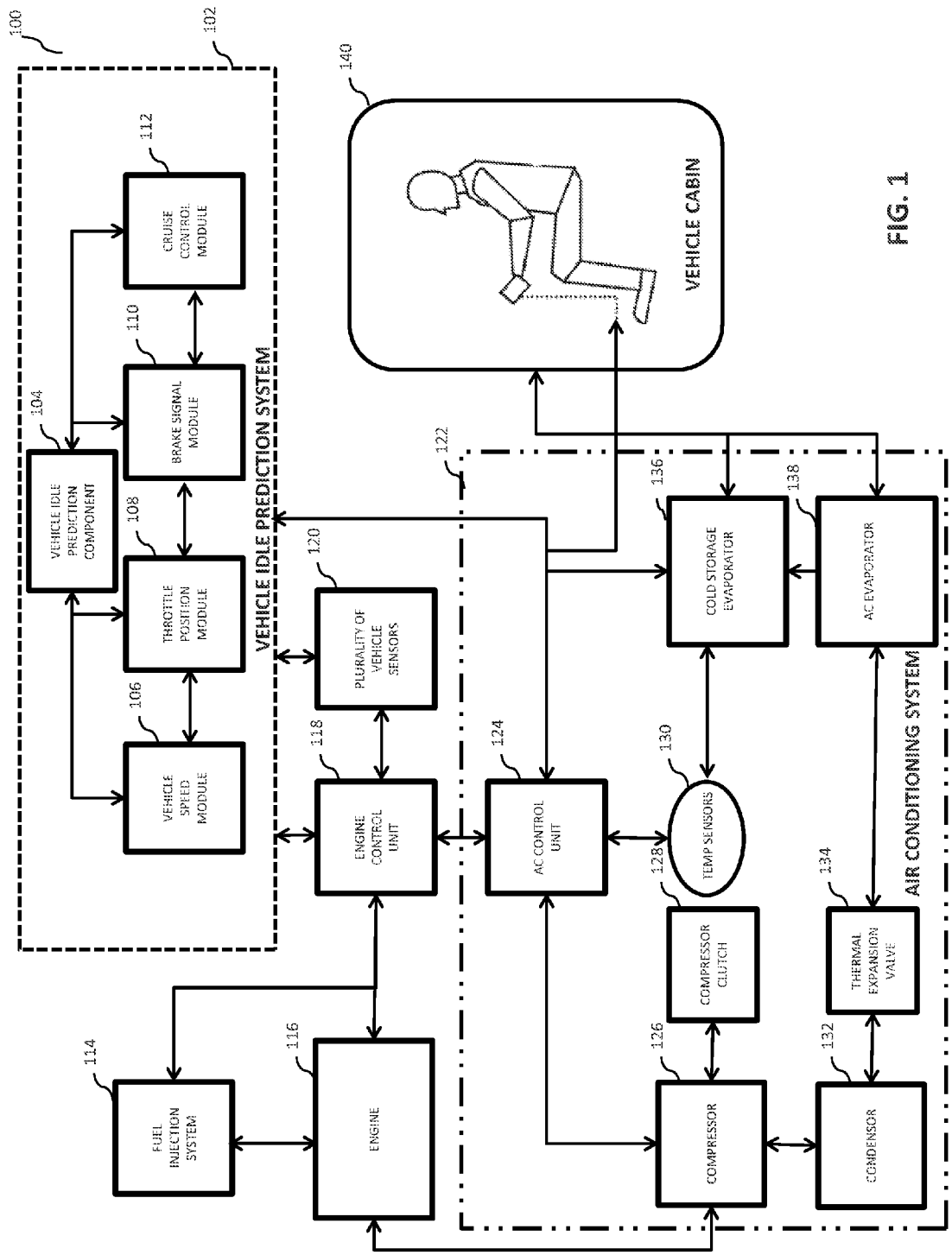
FIG. 1 is a schematic diagram showing an AC compressor efficiency control system.

The following includes definitions of selected terms employed herein. The definitions include various examples and/or forms of components that fall within the scope of a term and that can be used for implementation. The examples are not intended to be limiting.

A "processor," as used herein, processes signals and performs general computing and arithmetic functions. Signals processed by the processor can include digital signals, data signals, computer instructions, processor instructions, messages, a bit, a bit stream, or other means that can be received, transmitted and/or detected.

An "interface circuit" as used herein, refers to is a circuit that links one type of device or component such as the processor with another device or component and converts voltages between the processor and a receiving device or component.

A "bus" as used herein, refers to an interconnected architecture that is operably connected to transfer data between computer components within a singular or multiple systems. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Local Interconnect Network (LIN), among others.

A "memory," as used herein can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

An "operable connection," as used herein can include a connection by which entities are "operably connected", is one in which signals, physical communications, and/or logical communications can be sent and/or received. An operable connection can include a physical interface, a data interface and/or an electrical interface.

A "computer communication," as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. Computer communication can occur using various protocols and technologies as is known in the art. For example, these can include a wireless system (e.g., IEEE 802.11, IEEE 802.15.1 (Bluetooth)), an Ethernet system (e.g., IEEE 802.3), a token ring system (e.g., IEEE 802.5), a near field communication system (NFC) (e.g., ISO 13157), a local area network (LAN), a wide area network (WAN), a point-to-point system, a circuit switching system, a packet switching system, a cellular network system (e.g., CDMA, GSM, LTE, 3G, 4G), a universal serial bus, among others.

A "vehicle", as used herein, refers to any moving vehicle that is capable of carrying one or more human occupants and is powered by any form of energy. The term "vehicle" includes, but is not limited to: vehicles, trucks, vans, minivans, SUVs, motorcycles, scooters, boats, personal watercraft, and aircraft. In some cases, a motor vehicle includes one or more engines.

An "input device" as used herein can include devices for controlling different vehicle features which include various vehicle components, systems, and subsystems. The term "input device" includes, but is not limited to: push buttons, rotary knobs, and the like. The term "input device" additionally includes graphical input controls that take place within a user interface which can be displayed by various types of mechanisms such as software and hardware based controls, interfaces, or plus and play devices.

Referring now to the drawings, wherein the showings are for purposes of illustrating one or more exemplary embodiments and not for purposes of limiting the same, FIG. 1 shows an air conditioning compressor efficiency control system 100 being utilized in a vehicle (only a portion of which is shown) to provide energy efficient air conditioning cooling to occupants that are situated in a vehicle cabin 140 of the vehicle. The air conditioning compressor efficiency control system 100 provides air conditioning cooling to the occupants of the vehicle when the vehicle is in an idle-stop state.

As shown in the illustrated embodiment of FIG. 1, the vehicle generally includes, but is not limited to, a fuel injection system 114, an engine 116, an engine control unit 118, a plurality of vehicle sensors 120, and an air conditioning system 122. As will be appreciated by those skilled in the art, the fuel injection system 114 and the engine 116 can include various types of mechanisms and designs for admitting fuel into the engine 116. The engine control unit 118 can determine the quantity of fuel that is injected into the engine 116 from the fuel injection system 114. The engine control unit 118 can also control and provide details regarding the controlling of the vehicle speed, idle speed, and engine throttle positions.

In one embodiment, the engine control unit 118 can include an electronic control unit (not shown) to operably control numerous vehicle components (not shown). In an alternate embodiment, the engine control unit 118 can be operably connected to a separate electronic control unit. In an exemplary embodiment, a transmission control unit (not shown) is also included within the vehicle as a separate component that is operably connected to the engine control unit 118 to provide data regarding the vehicle transmission (i.e., power train) system.

The engine control unit 118 can include internal processing memory, an interface circuit, and bus lines for transferring data, sending commands, receiving data, and communicating with vehicle components, the plurality of vehicle sensors 120, and numerous vehicle systems. In an exemplary embodiment, the engine control unit 118 is operably connected to the plurality of vehicle sensors 120. The plurality of vehicle sensors 120 can include but are not limited to a vehicle speed sensor, a wheel speed sensor, a throttle position sensor, a brake signal sensor, and a cruise control sensor. The vehicle speed sensor and/or a wheel speed sensor provide speed data relating the speed of the vehicle as it is in operation.

The throttle position sensor monitors and provides the throttle position of the engine 116. In one embodiment, the engine control unit 118 can control the throttle position of an electronic throttle control, and the throttle position sensor can be utilized to enable that control. The engine control unit 118 and/or the transmission control unit can also be connected to a various signal sensors that are provided within the plurality of vehicle sensors 120 that can be utilized to provide the actuation status of the plurality of vehicle components and systems.

In an exemplary embodiment, the engine control unit 118 and/or the transmission control unit are connected to the brake signal sensor that can provide data regarding the actuation of a brake signal that is tied to the utilization of vehicle brakes. The brake signal sensor can sense signals that are sent from the vehicle braking system and/or a brake light switch to determine when the vehicle brakes are engaged and disengaged by the driver. The brake signal sensor can also include brake pad sensors that provide actuation data each time the brake pads of the vehicle are utilized to provide vehicle braking.

The engine control unit 118 and/or the transmission control unit can additionally be connected to a cruise control sensor. The cruise control sensor can provide cruise control signal actuation data that relates to enabling/disabling of the cruise control system and/or the start/stop of cruise control at a specific vehicle speed. In an alternate embodiment, the cruise control signal can be determined directly by the engine control unit 118 based on data provided by the vehicle speed sensor.

With continued reference to FIG. 1, the air conditioning system 122 of the air conditioning compressor efficiency control system 100 will now be discussed. In an exemplary embodiment, the air conditioning system 122 can operate in a traditional operating state, and an energy efficient operating state. The traditional operating state utilizes traditional components and technologies known in the art to provide air conditioning to the occupants of the vehicle located in the vehicle cabin 140. The energy efficient operating state can be utilized when the when the engine 116 is capable of being disabled during the vehicle idle-stop state.

When the air conditioning system 122 operates in the energy efficient operating state, air conditioning can be provided during the vehicle idle-stop state with the engine 116 and compressor 126 disabled. In some embodiments, the energy efficient operating state can also be utilized to provide more energy (i.e., fuel) efficient air conditioning to the occupants of the vehicle located in the vehicle cabin 140 when the engine 116 is re-enabled after the vehicle idle-stop state. As discussed in more detail below, in an exemplary embodiment, the energy efficient operating state is automatically enabled based on one or more vehicle driving factors that are evaluated by a vehicle idle prediction system 102.

The engine control unit 118 is also operably connected to the air conditioning system 122 of the vehicle via an AC control unit 124. In some embodiments, the air conditioning system 122 can be part of a broader HVAC system that utilizes a central control system to apply regulation to heating and air conditioning in the vehicle. In one embodiment, the vehicle electronic control unit may separately interact with components of the air conditioning system and/or the air conditioning control unit 124. The AC control unit 124 can include internal processing memory, an interface circuit, and bus lines for transferring data, sending commands, and communicating with various components of the air conditioning system 122 as well as the engine control unit 118.

An exemplary embodiment of the air conditioning system 122 shown in FIG. 1 includes, but is not limited to, a compressor 126, a compressor clutch 128, temperature sensors 130, a condenser 132, a thermal expansion valve 134, a cold storage evaporator 136, and an AC evaporator 138. In one embodiment, the temperature sensors 130 can be disposed in various locations within the air conditioning system 122 and/or the vehicle cabin 140 to be provided to the AC control unit 124. In an alternate embodiment, the temperature sensors 130 may be utilized to provide temperatures to the electronic control unit, the engine control unit 118, and/or the transmission control unit.

An exemplary embodiment of the traditional operating state of the air conditioning system will now be discussed in more detail. In an exemplary embodiment, the compressor clutch 128 connects the compressor 126 to the engine 116, and the AC control unit 124 sends an actuation signals to the compressor clutch 128 and the engine control unit 118 to utilize power from the engine 116 to power the compressor 126. In one embodiment, upon receiving the actuation signal from the AC control unit 124, the compressor clutch 128 can enable the compressor 126 to physically connect to the engine 116 and receive power from the belt assembly of the engine 116.

Upon being enabled by the compressor clutch 128, the compressor 126 intakes working fluid or a low pressurized gas and highly pressurizes the working fluid and/or low pressurized gas to discharge a very hot, high pressurized gas refrigerant to the condenser 132. Within the condenser 132 the very hot high pressurized gas refrigerant gets heat exchanged with outside air and cools off causing the gas to condense into cooled liquid refrigerant. The thermal expansion valve 134 is operably connected to the condenser 132 and the AC evaporator 138. The thermal expansion valve 134 operably controls the flow of cooled liquid refrigerant that is provided by the condenser 132 to the AC evaporator 138. The thermal expansion valve 134 can adjust the flow rate of the cooled liquid refrigerant based on a command initiated by the AC control unit 124 based on required temperature settings within the vehicle cabin 140. In one embodiment, the air conditioning system 122 can include a receiver (not shown) that receives the cooled liquid refrigerant that is provided by the condenser 132 and stores excess refrigerant to be utilized when required by the AC evaporator 138 (e.g., in a high/enhanced air-conditioning mode).

In an exemplary embodiment, the AC evaporator 138 receives the cooled liquid refrigerant from an outlet (on the AC evaporator 138) that is physically connected to the condenser 132. During the traditional operating state of the air conditioning system, the AC evaporator 138 converts the cooled liquid refrigerant to a cold (gas) air and forces the cold air to a blower fan (not shown) that further forces the cooled air out of the AC evaporator 138 to the vehicle cabin 140 of the vehicle. In the traditional operating state of the air conditioning system 122, the compressor 126 is enabled when the air conditioner is enabled and the engine 116 is enabled. The compressor 126 only becomes disabled when the engine 116 is disabled or in some cases when the air conditioner is disabled.

An exemplary embodiment of the energy efficient operating state of the air conditioning system will now be discussed in more detail. In an exemplary embodiment when AC control unit 124 enables an energy efficient operating state, the AC control unit 124 disables the compressor 126 (via the compressor clutch 128) when the air conditioning system 122 is enabled and the engine 116 is disabled. This technology provides a compressor 126 efficiency control that enables the engine 116 to utilize less power and run more efficiently while enabling the vehicle occupants to receive a constant flow of air conditioning within the vehicle cabin 140 when the vehicle is in an idle-stop state.

In an exemplary embodiment, when the air conditioning system is in an energy efficient operating state, the condenser 132 of the air conditioning system is disabled, and air conditioning is continually provided to the vehicle cabin from the cold storage evaporator 136. The cold storage evaporator 136 can store cold storage material. In some embodiments the cold storage material is a liquid based material that is capable of being frozen at a specific temperature point within the cold storage evaporator 136 and being utilized as a cooling agent upon being unfrozen. In an alternate embodiment, a cold storage material canister (not shown) can be included within the air conditioning system 122 that provides cold storage material to the cold storage evaporator 136. In an exemplary embodiment, the cold storage evaporator 136 is physically connected to the AC evaporator 138 via a duct or a conduit. As described in more detail below, the cold storage evaporator 136 receives cold air from the AC evaporator 138 to freeze the cold storage material. The cold storage evaporator 136 is capable of capturing cold air that is dissipated from the cold storage material as it unfreezes within the cold storage evaporator.

The vehicle idle prediction system 102 is utilized to provide a prediction to the AC control unit 124 as to when the vehicle will be put into the vehicle idle state, as described in more detail below. Specifically, a driving style profile produced by the vehicle idle prediction system 102 is utilized as a predictor as to when the vehicle will stop and the engine 116 and the compressor 126 will be disabled in the vehicle idle-stop state. In an exemplary embodiment of the energy efficient operating state, when the engine 116 is enabled, the air conditioning system 122 operates in a semi-traditional state. For instance, the compressor 126 is enabled and the condenser 132 continues to operate to provide cooled liquid refrigerant to the AC evaporator 138.

In one embodiment, the driving style profile provided by the vehicle idle prediction system 102 can be utilized by the AC control unit 124 to enable the energy efficient operating state and to activate the AC evaporator 138 to selectively freeze the cold storage material within the cold storage evaporator 136 in accordance with required temperature settings within the vehicle cabin 140. Based on the prediction data provided by the vehicle idle prediction system 102, the AC evaporator 138 provides an amount highly cooled air to the cold storage evaporator 136 at a temperature that is required to freeze the cold storage material. The AC evaporator 138 also simultaneously continues to provide cold air to the blower fan to be pushed out to the vehicle cabin 140. The AC control unit 124 additionally controls the release of a specific volume of cold storage material to be frozen at a specific point in time based on the data provided by the vehicle idle prediction system 102, temperature sensors 130, and by the temperature preferences of the vehicle occupants in the vehicle cabin 140. In some embodiments, the volume of cold storage material is released for freezing from the cold storage material canister to the cold storage evaporator 136 to be frozen.

The cold storage material is frozen at a temperature sufficient to freeze the volume of cold storage material within the cold storage evaporator 136 while the engine 116 is still enabled (i.e., prior to the vehicle being in the idle-stop state). In an exemplary embodiment, the freezing of cold storage material by the AC evaporator 138 occurs when the vehicle is starting to decelerate prior to going into the vehicle-idle state. In an alternate embodiment, the freezing of cold storage material can occur as the vehicle is being driven based on the data provided by the vehicle idle prediction system to the AC control unit 124.

When the vehicle is in the vehicle idle state, the cold storage material unfreezes and dissipates cold air within the cold storage evaporator 136. The cold storage evaporator 136 then sends the cold air to be blown out via the blower fan to the vehicle cabin 140 to ensure that the occupants of the vehicle continue to receive cooled air from the air conditioning system 122 while the compressor 126 is disabled. In an alternate embodiment, while in the energy efficient operating state, the air conditioning system 122 can continue to keep the compressor 126 disabled and provide cooled air to the vehicle cabin 140 even when the engine 116 is re-enabled after the vehicle starts moving and is no longer in the vehicle idle-stop state to provided an enhanced level of fuel economy.

With continued reference to FIG. 1, the components and operations of the vehicle idle prediction system 102 of the air conditioning compressor efficiency control system 100 will now be discussed. As described above, in an exemplary embodiment, the vehicle idle prediction system 102 sends the driving style profile to the AC control unit 124 to enable the energy efficient operating state and/or the traditional AC operating state. In one embodiment the driving style profile can include a description that is related to a city driving mode, a highway driving mode etc. that correlates with the propensity of the vehicle stopping movement and being put into the vehicle idle-stop state (i.e., the engine 116 and compressor 126 being disabled). In an alternate embodiment, the vehicle idle prediction system 102 sends a total driving score (numeric value) that can be evaluated by the AC control unit 124 to enable the energy efficient operating state and/or the traditional AC operating state.

The vehicle idle prediction system 102 can be a stand alone unit that includes a separate processor that can communicate with the engine control unit 118 and/or the plurality of vehicle sensors 120 and executes processes associated with several modules 106-112 and a vehicle idle prediction component 104. In an alternate embodiment, the vehicle idle prediction system 102 can be integrated within various vehicle systems to be utilized to provide vehicle driving factors to the vehicle systems. The vehicle idle prediction system 102 includes a vehicle speed module 106, a throttle position module 108, a brake signal module 110, and a cruise control module 112 that supplies scoring data that are related to corresponding vehicle driving factors to the vehicle idle prediction component 104.

In an exemplary embodiment, the vehicle idle prediction system 102 is connected to the plurality of vehicle sensors 120 to determine vehicle driving factors provided by the plurality of vehicle sensors 120. In an alternate embodiment, the vehicle idle predication system 102 additionally communicates with the engine control unit 118 to receive engine 116 utilization characteristics such as RPM related data, and/or throttle position data to determine vehicle driving factors. In yet an additional embodiment, the vehicle idle prediction system 102 may additionally communicate with the transmission control unit to determine powertrain (i.e., gear shift patterns) to deduce certain vehicle driving factors.

Figure 2:
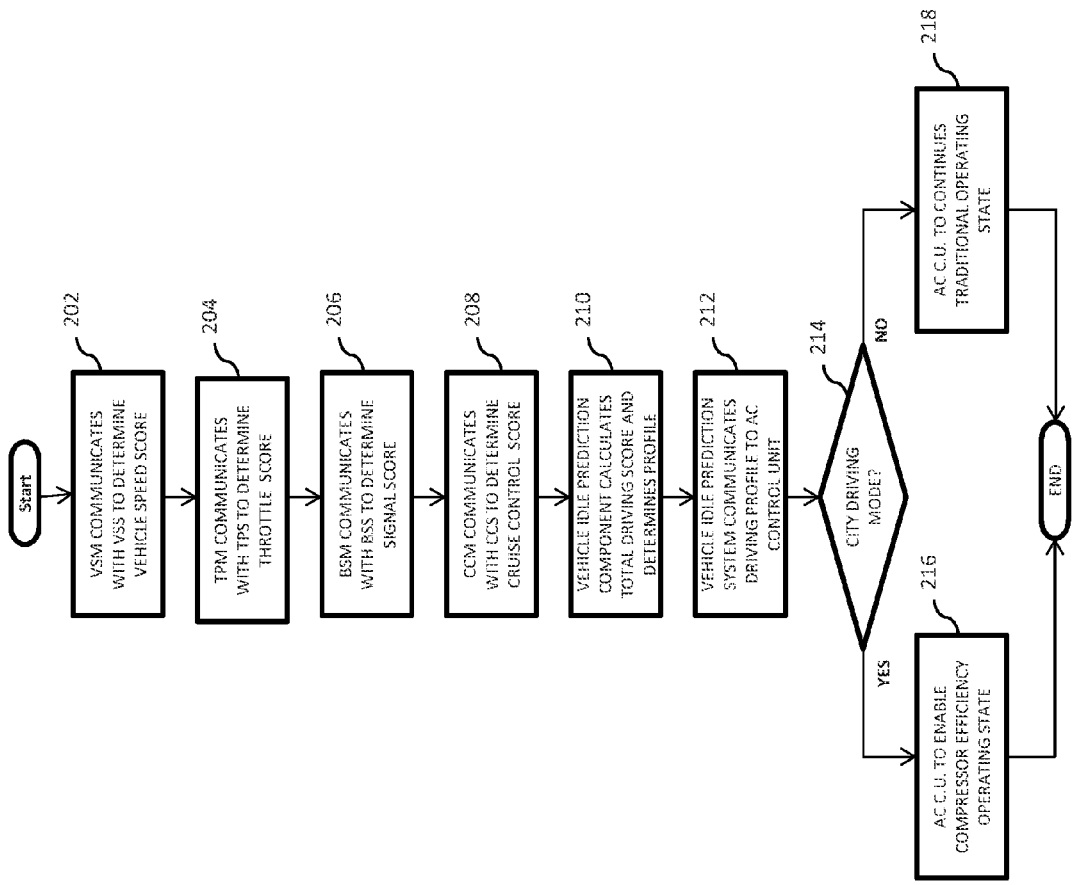
FIG. 2 is a process flow diagram of a method for operating a vehicle air conditioner compressor.

Referring now to FIG. 2, a process flow diagram of a method utilized by an exemplary embodiment of a vehicle idle prediction system 102 from the operating environment of FIG. 1 is shown. The method depicted in FIG. 2 is used to determine the operating state of the compressor 126 of the air conditioning system 122. At step 202, the vehicle speed module 106 communicates with the vehicle speed sensor of the plurality of vehicle sensors 120 to obtain data regarding the speed of the vehicle at a certain point in time. In an alternate embodiment the vehicle speed module 106 communicates directly with the engine control unit 118 and/or the transmission control unit to determine data regarding the speed of the vehicle at certain points of time.

Figure 3A:
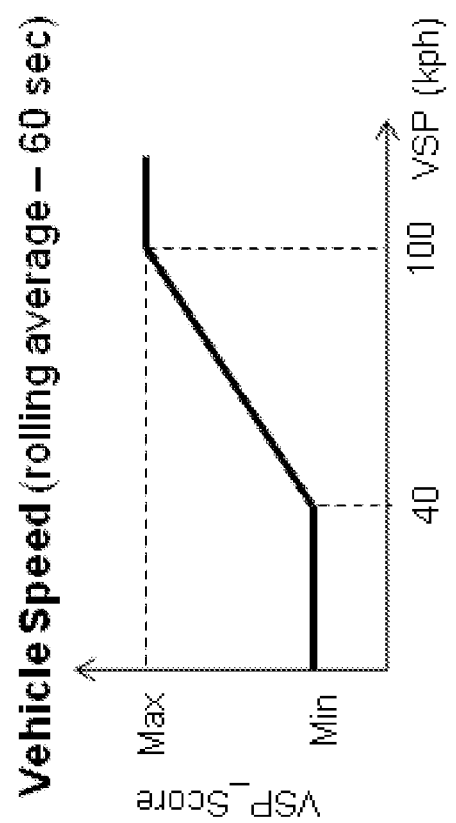
FIG. 3A is a graph depicting an illustrative example of vehicle speed scoring that is utilized in a driving prediction calculation.

Referring now to FIG. 3A, a graph for explaining an illustrative example of vehicle speed scoring that is utilized by the vehicle speed module 106 to determine a vehicle speed score is shown. The vehicle speed module 106 tracks the speed of the vehicle over a predetermined time interval as it is received by the vehicle speed sensor and/or the wheel speed sensor. Once the vehicle speed is tracked, the vehicle speed module 106 determines the vehicle speed score by computing the rolling average of the vehicle speed over the predetermined time interval. For example, as shown in FIG. 3A, the vehicle speed module 106 can determine the vehicle speed (VSP) during sixty second intervals and calculate the rolling average of the vehicle speed to determine a vehicle speed score (VSP_Score) that corresponds with the value of rolling average of the speed (i.e., the higher the speed the higher the vehicle speed score).

In an alternate embodiment, rather then calculating the vehicle speed score during a predetermined interval of time (as shown in FIG. 3A), the vehicle speed module 106 can determine the vehicle speed and calculate the vehicle speed score over an amount of time between each separate start and stop event of the vehicle. In other words, the vehicle speed score can be determined by the vehicle speed module 106 for each time period between the enabling of the engine 116 and the disabling of the engine 116 that occurs when the vehicle is in the vehicle idle-stop state (upon the vehicle stopping movement). Upon calculating the vehicle speed score, the vehicle speed module 106 sends the vehicle speed score to the vehicle idle prediction component 104 to be processed. The vehicle speed module 106 can also send the vehicle speed score to the vehicle systems to be utilized. For example, vehicle safety systems can utilize the vehicle speed score to provide vehicle safety features that can be enabled based on vehicle speed.

Figure 3B:
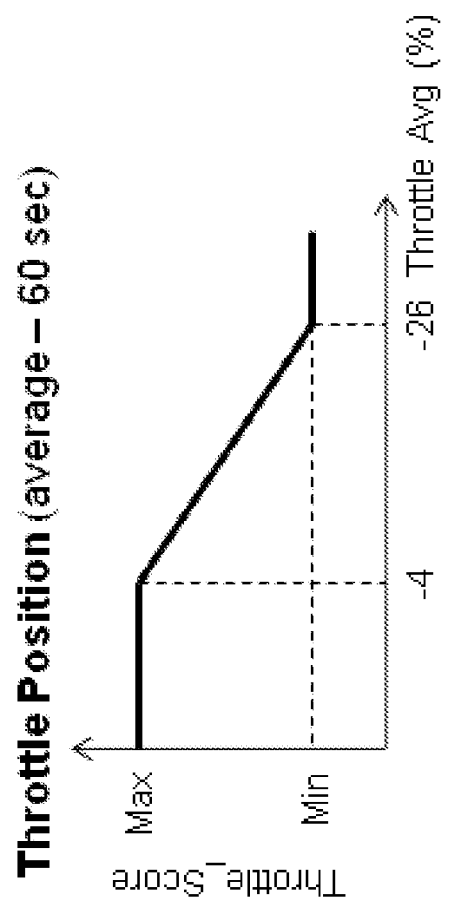
FIG. 3B is a graph depicting an illustrative example of brake signal scoring that is utilized in a driving prediction calculation.

Referring back to FIG. 2, at step 204 the throttle position module 108 communicates with the throttle position sensor of the plurality of vehicle sensors 120 to obtain data regarding the throttle position of the vehicle at a certain point in time. In an exemplary embodiment the throttle position module 108 communicates directly with the engine control unit 118 to determine data regarding the throttle position of the engine 116 at certain points in time. Referring now to FIG. 3B, a graph for explaining an illustrative example of throttle position scoring that is utilized by the throttle position module 108 to determine a throttle position score is shown. The throttle position module 108 tracks the position of the throttle in the engine provided by the throttle position sensor over a predetermined time interval. For example, as shown in FIG. 3B, the throttle position module 108 can determine the minimum value of throttle position and the maximum value of the throttle position over the course of a predetermined sixty second time interval. The throttle position module 108 calculates a throttle position score (Throttle_Score) based on the average position of the vehicle throttle (ThrottleAvg) over the course of the predetermined time interval (e.g., sixty seconds). In one embodiment, the throttle position module 108 can determine the throttle position score based on the angle of a throttle plate within the engine 116 over the course of each predetermined time interval.

In an alternate embodiment, rather then calculating the throttle position score during a predetermined interval of time (as shown in FIG. 3B), the throttle position module 108 can determine the average throttle position and the throttle position score over an amount of time between each separate start and stop event of the vehicle. In other words, the throttle position score is determined by the throttle position module 108 for each time period between the enabling of the engine 116 and the disabling of the engine 116 that occurs when the vehicle is in the vehicle idle-stop state (upon the vehicle stopping movement). Upon calculating the throttle position score, the throttle position module 108 sends the throttle position score to the vehicle idle prediction component 104 to be processed. In an alternate embodiment, the throttle position module 108 sends the throttle position score to the other vehicle systems to be utilized.

Referring back to FIG. 2, at step 206, the brake signal module 110 communicates with the brake signal sensor of the plurality of vehicle sensors 120 to obtain data regarding the amount of braking that occurs at a certain point in time. The brake signal module 110 determines the actuation of the vehicle brakes each time the driver presses the brake pedal of the vehicle to slow or stop the vehicle. As discussed above, the brake signal sensor can also determine the actuation of the brake signal based on data provided by brake pad sensors and/or the actuation of the vehicle brake lights.

Figure 3C:
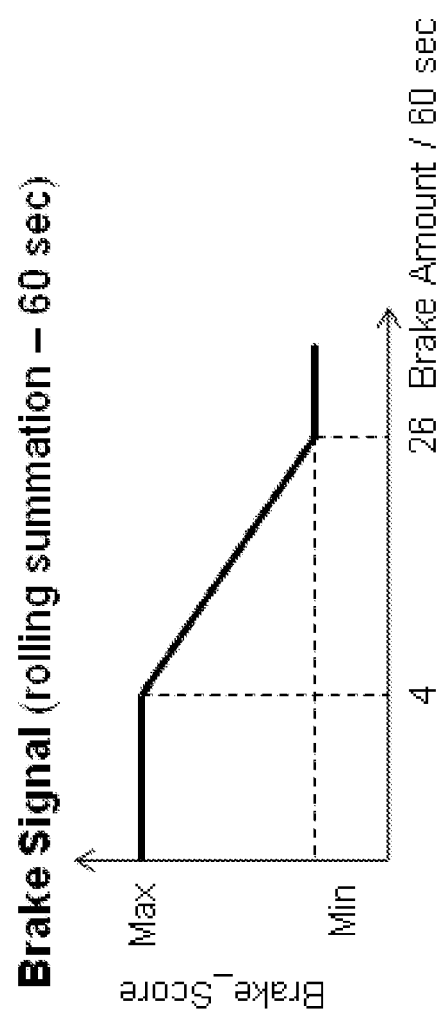
FIG. 3C is a graph depicting an illustrative example of throttle position scoring that is utilized in a driving prediction calculation.

Referring now to FIG. 3C, a graph for explaining an illustrative example of brake signal scoring that is utilized by the brake signal module 110 to determine a brake signal score is shown. The brake signal module 110 utilizes the vehicle braking data and provides a rolling summation of the amount of braking that occurs during a predetermined time interval. For example, as shown in FIG. 3C, the brake signal module 110 can determine the amount of braking during sixty second intervals and calculate the rolling summation of the amount of braking (Brake Amount) to determine a braking signal score (Brake_Score). In the exemplary embodiment shown, the brake signal monitor calculates a lower braking score when the brake amount is higher. Accordingly, the brake signal monitor calculates a higher brake signal score when the brake signal is lower.

In an alternate embodiment, rather then calculating the brake signal score during a predetermined interval of time (as shown in FIG. 3C), the brake signal module 110 can determine the actuation of the brake signal and the brake signal score over an amount of time between each separate start and stop event of the vehicle. In other words, the brake signal score is determined by the brake signal module 110 for each time period between the enabling of the engine 116 and the disabling of the engine 116 that occurs when the vehicle is in the vehicle idle-stop state (upon the vehicle stopping movement).

Upon calculating the brake signal score, the brake signal module 110 sends the brake signal score for each time interval to the vehicle idle prediction component 104 to be processed. In an alternate embodiment, the brake signal module 110 sends the brake signal score for each time interval to the other vehicle systems to be utilized. For example, vehicle safety systems can utilize the brake signal score to provide vehicle safety features that can be enabled based on the amount of vehicle braking that occurs during a given time period.

Referring back to FIG. 2, at step 208, the cruise control module 112 communicates with the cruise control sensor of the plurality of vehicle sensors 120 to obtain data regarding the actuation of the cruise control system at a certain point in time. In an exemplary embodiment the cruise control module 112 determines the actuation of the vehicle cruise control system each time the driver initiates the cruise control system. The cruise control sensor can determine the enabling of the cruise control signal based on the driver's initiation of the cruise control system to start/stop cruise control on a set vehicle speed.

Figure 3D:
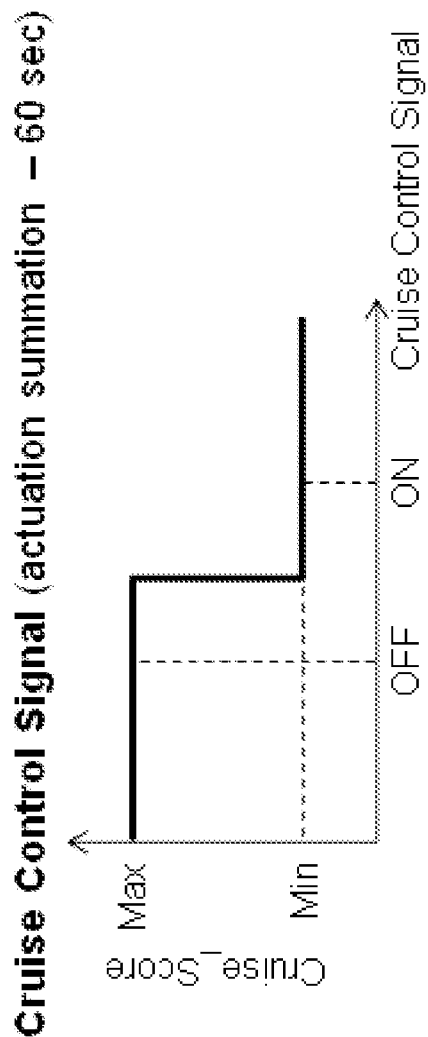
FIG. 3D is a graph depicting an illustrative example of cruise control signal scoring that is utilized in a driving prediction calculation.

Referring now to FIG. 3D, a graph for explaining an illustrative example of cruise control scoring that is utilized by the cruise control module 112 to determine a cruise control score is shown. The cruise control module 110 utilizes the cruise control actuation data and provides a cruise control score based on calculating the total amount of time the cruise control is activated at a particular vehicle speed during a predetermined time interval. For example, if the driver is driving for a predetermined interval of sixty seconds, the cruise control module determines if the cruise control signal is activated (by the driving pressing a set cruise control actuation input), and if the cruise control switch remains actuated or has been re-actuated based on the driver disabling cruise control at the particular vehicle speed (by the driver pressing a cruise control cancel input) or the driving utilizing the brakes of the vehicle to disable the cruise control set speed (due to a traffic situation).

For example, as shown in FIG. 3D, the cruise control module 112 assigns a higher cruise control score (Cruise_Score) when the cruise control signal (Cruise Control Signal) is activated and remains actuated during the predetermined time interval. Accordingly, the cruise control score calculates a lower cruise control score when cruise control signal is not activated. Consequently, the cruise control score fluctuates based on when the cruise control signal is reactivated during the course of the predetermined time interval due to the deactivation of the cruise control signal at one or more points during the predetermined time interval as provided by the cruise control sensor.

In an alternate embodiment, rather then calculating a cruise control score during a predetermined interval of time (as shown in FIG. 3D), the cruise control module 110 can determine the activation of the cruise control signal and the cruise control score over an amount of time between each separate start and stop event of the vehicle. In other words, the cruise control score is determined by the cruise control module 112 for each time period between the enabling of the engine 116 and the disabling of the engine 116 that occurs when the vehicle is in the vehicle idle-stop state (upon the vehicle stopping movement). Upon determining the cruise control score, the cruise control module 112 sends the cruise control score for each time interval to the vehicle idle prediction component 104 to be processed.

Referring back to FIG. 2, at step 210, the vehicle idle prediction component 104 calculates a total driving score and determines the driving style profile. The vehicle idle prediction component 104 calculates the summation of the scores provided by the modules 106-112, as described above, and determines the total driving score for a period of time. In an exemplary embodiment, the vehicle idle prediction component 104 calculates the total driving score for each predetermined interval of time utilized by the modules 106-112. In one embodiment, the vehicle idle prediction component can utilize the same amount of time interval as was utilized by the modules 106-112 upon calculation of the respective scores. For example, as shown in FIGS. 3A-3D the modules 116-112 calculated the respective scores during the predetermined time interval of sixty seconds. Accordingly, the vehicle idle prediction component 104 can calculate the total driving score during the same predetermined time interval of sixty seconds.

In an alternate embodiment, rather then calculating the total driving score during a predetermined interval of time, the vehicle idle prediction component 104 can calculate the total driving score over an amount of time between each separate start and stop event of the vehicle. In other words, the vehicle idle prediction component 104 can calculate and provide a total driving score for each time period between the enabling of the engine 116 and the disabling of the engine 116 that occurs when the vehicle is in the vehicle idle-stop state (upon the vehicle stopping movement).

Upon determining the total driving score, the vehicle idle prediction component 104 determines if the total driving score is above or below a predetermined threshold. In an exemplary embodiment, the vehicle idle prediction component 104 assigns two or more of the driving style profiles to provide a predictor as to if and when the vehicle will stop and the engine 116 and the compressor 126 will be disabled in the vehicle idle-stop state. In one embodiment, the vehicle idle prediction component 104 assigns two distinct driving style profiles as a highway driving style profile and a city driving style profile.

In some embodiments, the vehicle idle prediction component 104 can assign additional driving style profiles in addition to the highway driving profile and the city driving profile that relate to additional driving patterns. The numerous driving style profiles can be assigned based on different ranges of total driving scores that are determined by the vehicle idle prediction component 104. For the purposes of simplicity, however the exemplary embodiment will be described with reference to the two distinct driving profiles of the highway driving style profile and the city driving style profile that correlate to the propensity that the vehicle will stop (i.e., the vehicle will be put into the vehicle-idle state) based on corresponding driving factors (i.e., vehicle speed, braking patterns, use of cruise control, etc.)

At step 212, the vehicle idle prediction system 102 communicates the driving profile to the AC control unit 124. The driving style profiles can be utilized by the AC control unit 124 to evaluate the propensity of the vehicle being stopped, the engine 116 being disabled, and the compressor 126 being disabled in order to selectively enable the energy efficient operating state of the air conditioning system 122. At step 214, the AC compressor efficiency control determines if the driving style profile assigned by the vehicle idle precision system 102 for a given time period is the city driving style profile.

At step 216, if it is determined that the driving style profile for a given time period is the city driving style profile, the AC control unit 124 enables the compressor efficiency operating state. Consequently, the AC control unit 124 enables the AC evaporator 138 to selectively freeze the cold storage material within the cold storage evaporator 136 in accordance with required temperature settings to be able to provide cold air within the vehicle cabin 140 as the compressor 126 is disabled in the vehicle idle-stop state. At step 218, if it is determined that the driving style profile for a given time period is not the city driving style profile (i.e., the driving style profile is the highway driving style profile), then the AC control unit 124 continues operating the air conditioning system 122 in the traditional operating state and the compressor 126 continues to stay enabled to provide cooling to the vehicle cabin 140 via the AC evaporator 138.

Figure 4A:
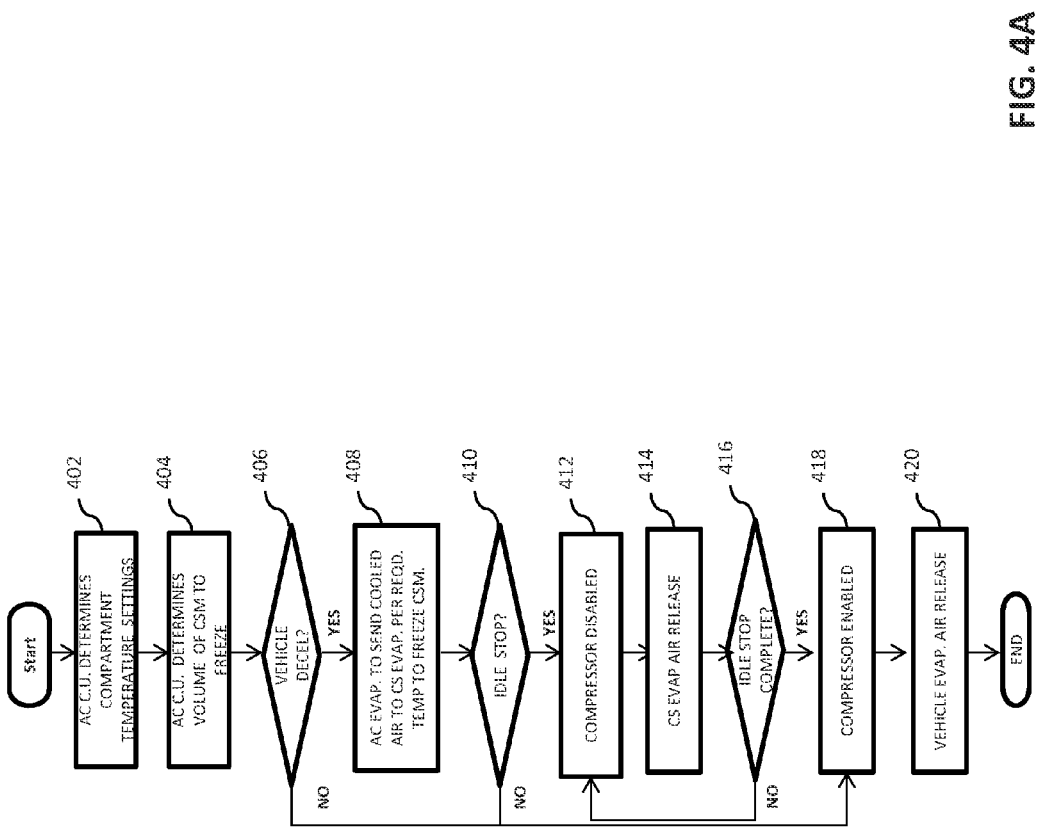
FIG. 4A is a process flow diagram of a method for cold storage release.

Referring now to FIG. 4A, a process flow diagram of a method utilized by an exemplary embodiment of the air conditioner compressor efficiency control system 100 within the operating environment of FIG. 1 is shown that occurs when the AC control unit 124 enables the compressor efficiency operating state. The method of FIG. 4A will be expanded on with an accompanying graph shown in FIG. 4B for explaining an illustrative example according to the method utilized by the exemplary embodiment in FIG. 4A.

At step 402, the AC control unit 124 determines the temperature settings that are set by the occupants of the vehicle in the vehicle cabin 140. In one embodiment, the occupants of the vehicle can utilize input controls and/or a user interface tied to the operation of the air conditioning system 122 to set a predetermined level of cooling (e.g., low, medium, or high) and/or a specific temperature setting (e.g., 72 degrees). In an alternate embodiment, the AC control unit 124 can utilize the temperature sensors 130 within the vehicle cabin 140 to determine current temperature settings.

At step 404, upon determining the temperature settings, the AC control unit 124 determines the volume of cold storage material that should be released within the cold storage evaporator 136 in order to be frozen to provide cooling during the vehicle-idle stop state. In one embodiment, in addition to the temperature settings, the volume of cold storage material that is released for freezing also depends on the numerical total driving score that is determined by the vehicle idle prediction system. The total driving score can be utilized to determine the propensity of the vehicle stopping more or less frequently during a period of time that consequently requires more or less cold storage material to be frozen in order to provide cooling from the cold storage evaporator 136 during the vehicle idle-stop state.

At step 406, the AC control unit 124 determines if and when the vehicle is decelerating. In one embodiment, the plurality of vehicle sensors 120 communicate deceleration of the vehicle to the AC control unit 124. At step 418, if the vehicle is not determined to be decelerating (at step 406), the air conditioner control unit 124 provides traditional air conditioned cooling to the vehicle cabin by keeping the compressor 126 in an enabled state. At step 408, upon determining that the vehicle is decelerating (at step 406), the AC control unit 124 sends an actuation signal to the AC evaporator 138 to provide cold air to the cold storage evaporator 136 at a temperature sufficient to freeze the volume of cold storage material (determined at step 404) within the cold storage evaporator 136 while the engine 116 is still enabled (i.e., prior to the vehicle being in the idle-stop state).

Figure 4B:
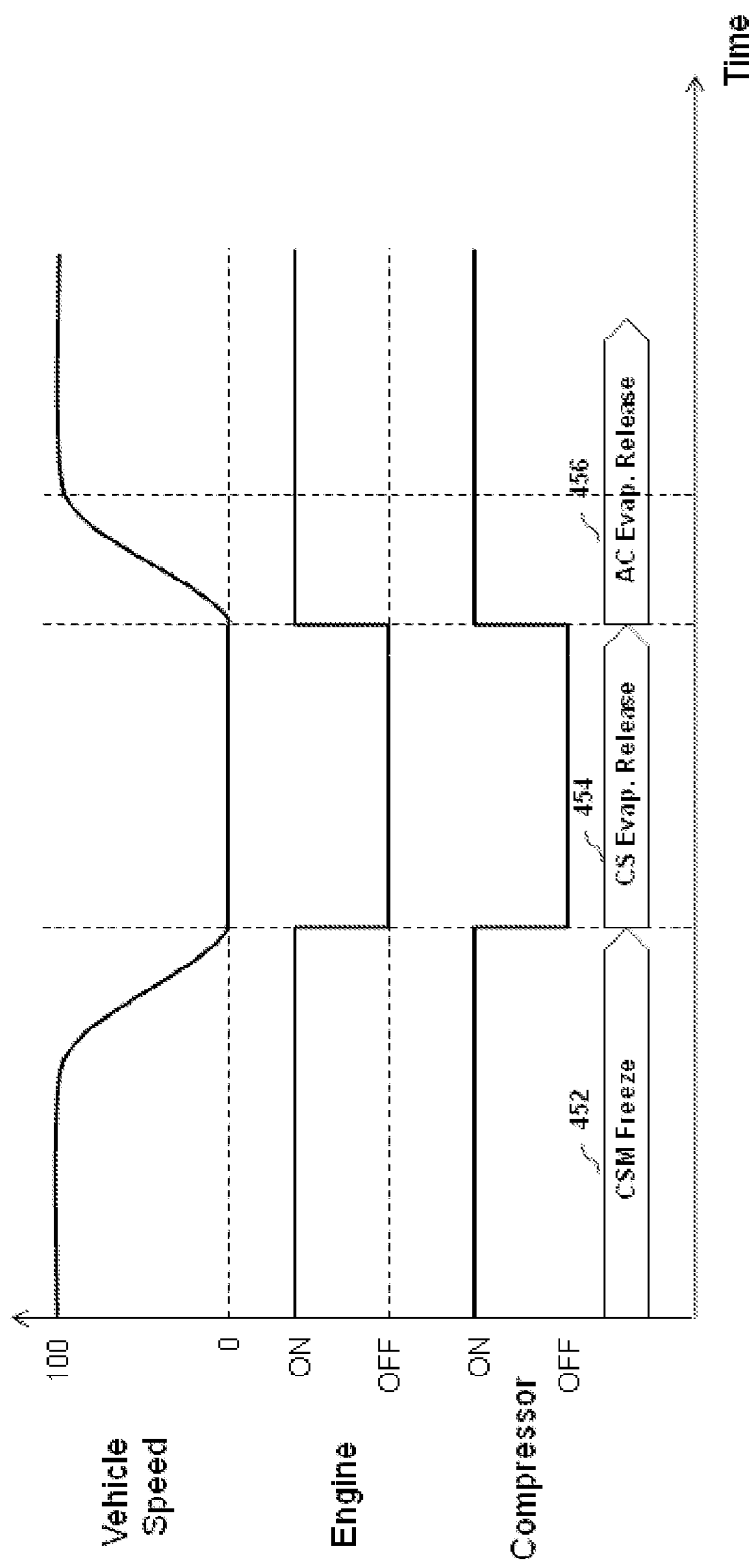
FIG. 4B is a graph depicting an illustrative example of cold storage release and vehicle evaporator release points according to the method utilized by the exemplary embodiment in FIG. 4A.

With reference to FIG. 4B, the cold storage material freeze 452 occurs when the vehicle speed sensor signals the decrease in vehicle speed associated with coasting and/or braking to the AC control unit 124. As described above, the AC evaporator 138 continues to provide cooled air to the vehicle cabin 140 as the vehicle is in movement, and the engine 116 and compressor 126 continue to be enabled (ON). Once the volume of cold storage material is frozen within the cold storage evaporator 136, the AC evaporator 138 continues to provide cooled air to keep the cold storage material frozen until it is to be released to the vehicle cabin 140.

With reference back to FIG. 4A, at step 410, it is determined if the vehicle is in the vehicle idle stop state. If the vehicle is not determined to in the vehicle idle state (at step 410), the air conditioner control unit 124 provides traditional air conditioned cooling to the vehicle cabin by keeping the compressor 126 in an enabled state at step 418. At step 412, if it is determined that the movement of the vehicle is in the idle-stop state, the compressor is disabled. The AC evaporator 138 ceases to provide cooled air to freeze the cold storage material within the cold storage evaporator.

With reference to FIGS. 4A and 4B, since the compressor 126 is disabled (OFF), cooling is no longer provided to the vehicle cabin 140 from the AC evaporator 138. At step 414, the cold storage material unfreezes and cooled air is released from the cold storage evaporator 136 and sent through the blower fan to be pushed within the vehicle cabin 140. The cold storage evaporator release 454 occurs as the vehicle is stopped and the engine 116 is disabled (OFF). The release of cold storage material from the cold storage evaporator provides a consistent level of cooling per the vehicle cabin 140 temperature setting determined by the AC control unit 124 (at step 402). In some embodiments, the temperature of the cold storage release is derivative of the volume of cold storage material that is determined by the AC control unit 124 (at step 404) and is provided for freezing (at step 408). In alternate embodiments, the cold storage evaporator 126 can include a separately (battery) powered heater coil that can be enabled to rapidly unfreeze the cold storage material to provide a higher level of cooling (less temperature) based on the determined temperature settings.

At step 416, it is determined if the vehicle idle-stop state is completed. In other words, when the vehicle starts to move, the engine control unit 118 re-enables the engine 116, and the fuel injection system 114 resumes the injection of fuel to the re-enabled engine 116. At step 418, the compressor 126 is re-enabled by the air conditioner control unit 118 as the vehicle is in movement. At step 420, traditional air conditioned cooling is provided to the vehicle cabin 140 via the AC evaporator 138 (AC evaporator release 456). The cold storage evaporator 136 ceases to provide cooled air to the vehicle cabin 140 and the remaining cold storage material in the cold storage evaporator unfreezes and is retained for future use. In an exemplary embodiment, once the engine 116 is re-enabled the AC control unit 124 re-determines the vehicle cabin 140 temperature settings at step 402 to restart the compressor efficient control method in order to continually provide enhanced vehicle fuel efficiency.

Figure 5A:
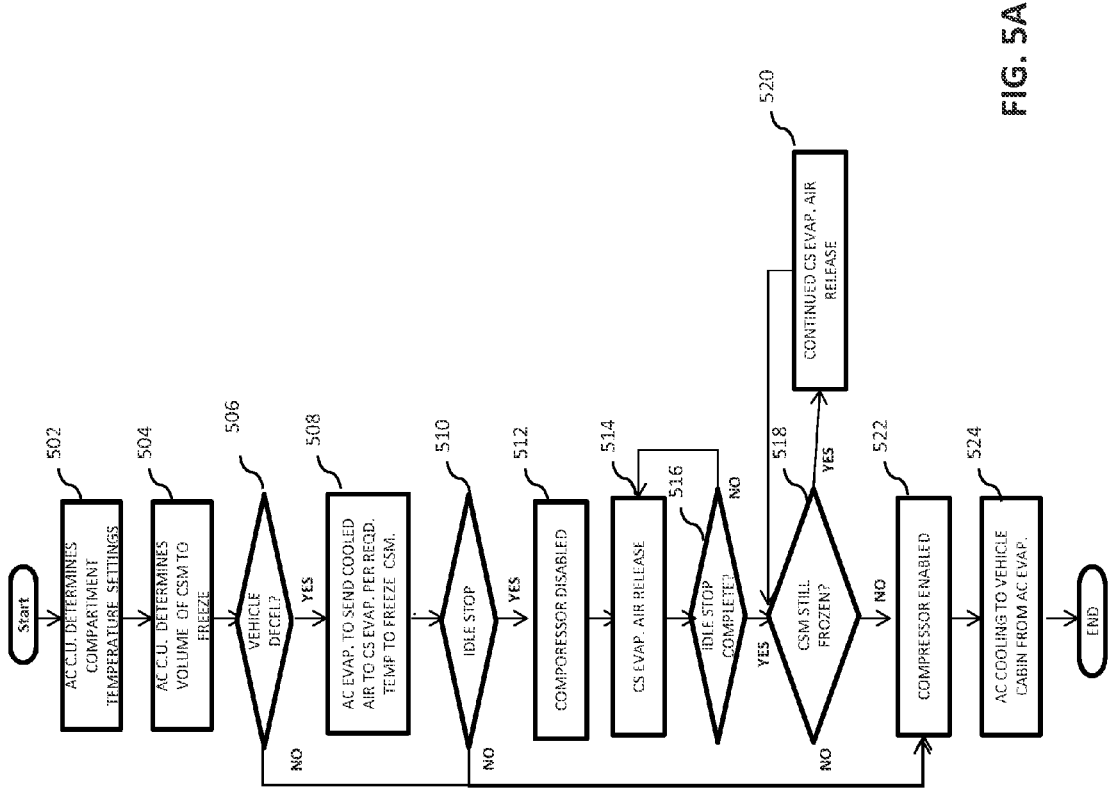
FIG. 5A is a process flow diagram of another method for cold storage release.

Referring now to FIG. 5A, a process flow diagram of a method utilized by an exemplary embodiment of the AC compressor efficiency control system in the operating environment of FIG. 1 is shown that occurs when the AC control unit 124 enables the compressor efficiency operating state for an enhanced period of time. The method of FIG. 5A will be expanded on with accompanying graph shown in FIG. 5B for explaining an illustrative embodiment according to the method utilized by the exemplary embodiment in FIG. 5A.

At step 502, the AC control unit 124 determines the vehicle cabin 140 temperature settings. At step 504, upon determining the temperature settings, the AC control unit 124 determines the volume of cold storage material that should be released within the cold storage evaporator 136 in order to be frozen to provide cooling during the vehicle-idle stop state and to provide an enhanced level of fuel efficiency by additionally providing prolonged cooling for a period of time after the vehicle-idle stop state. The prolonged cooling from the cold storage evaporator 136 is provided to keep the compressor disabled even after the engine 116 is re-enabled.

In one embodiment, the total driving score can be utilized to determine the propensity of the vehicle stopping more or less frequently during a period of time that consequently requires more or less cold storage material to be frozen in order to provide cooling from the cold storage evaporator 136 during the vehicle idle-stop state and when the vehicle engine 116 is re-enabled for a longer period of time after being in the vehicle idle-stop state. At step 506, the AC control unit 124 determines if and when the vehicle is decelerating. At step 522, if the vehicle is not determined to be decelerating (at step 506), the air conditioner control unit 124 provides traditional air conditioned cooling to the vehicle cabin by keeping the compressor 126 in an enabled state.

At step 508, upon determining that the vehicle is decelerating (at step 506), the AC control unit 124 sends an actuation signal to the AC evaporator 138 to provide cold air to the cold storage evaporator 136 at a temperature sufficient to freeze the volume of cold storage material (determined at step 504) within the cold storage evaporator 136 while the engine 116 is still enabled (i.e., prior to the vehicle being in the idle-stop state). With reference to FIG. 5B, the cold storage material freeze 552 occurs when the vehicle speed sensor signals the decrease in vehicle speed associated with coasting and/or braking to the AC control unit 124. The AC evaporator 138 continues to provide cooled air to the vehicle cabin 140 as the vehicle is in movement, and the engine 116 and compressor 126 continue to be enabled (ON). Once the volume of cold storage material is frozen within the cold storage evaporator 136, the AC evaporator 138 continues to provide cooled air to keep the cold storage material frozen until it is to be released to the vehicle cabin 140.

With reference back to FIG. 5A, at step 510, it is determined if the vehicle is in the vehicle idle stop state. If the vehicle is not determined to be in the vehicle idle state (at step 510), the air conditioner control unit 124 provides traditional air conditioned cooling to the vehicle cabin by keeping the compressor 126 in an enabled state at step 522. At step 512, if it is determined that the vehicle is in the idle-stop state, the compressor is disabled. The AC evaporator 138 ceases to provide cooled air to freeze the cold storage material within the cold storage evaporator 136.

With reference to FIGS. 5A and 5B, since the compressor 126 is disabled (OFF), cooling is no longer provided to the vehicle cabin 140 from the AC evaporator 138. At step 514, the cold storage material unfreezes and cooled air is released from the cold storage evaporator 136 and sent through the blower fan to be pushed within the vehicle cabin 140. The cold storage evaporator release 554 occurs as the vehicle is stopped and the engine 116 is disabled. The release of cold storage material from the cold storage evaporator provides a consistent level of cooling per the vehicle cabin 140 temperature setting determined by the AC control unit 124 (at step 502).

At step 516, it is determined if the vehicle idle-stop state is complete. For example, the engine control unit 118 can send a signal to the AC control unit 124 when the vehicle resumes movement after being stopped, and the engine 116 is re-enabled. At step 518, if it is determined that the vehicle idle-stop state is complete, the AC control unit 124 further determines if a sufficient amount of the cold storage material within the cold storage evaporator 136 remains frozen to continue to provide air conditioned cooling from the cold storage evaporator 136 to the vehicle cabin 140. In one embodiment, the AC control unit 124 communicates with the temperature sensor 130 that is located within the cold storage evaporator 136 to determine the temperature within the cold storage evaporator 136 to make the determination if a sufficient amount of cold storage material remains frozen. In an alternate embodiment, the AC control unit 124 can utilize sensors within the cold storage evaporator 136 that can sense the amount of cold storage material that is frozen and/or unfrozen.

With continued reference to FIGS. 5A and 5B, if it is determined (at step 518) that there is no longer a sufficient amount of cold storage material that remains frozen within the cold storage evaporator 136, the AC control unit 124 re-enables the compressor 126 at step 522 to provide traditional air conditioned cooling. If it is determined (at step 518) that there is a sufficient amount of cold storage material that remains frozen within the cold storage evaporator to continue to provide air conditioned cooling from the cold storage evaporator 136 to the vehicle cabin 140, (as shown in FIG. 5B in comparison to FIG. 4B), the compressor 126 remains disabled for a period of time after the engine 116 is re-enabled (ON) and vehicle is no longer is in the vehicle idle-stop state.

At step 520, with the engine 116 enabled, and the compressor 126 disabled, the cold storage evaporator can continue to release cold air 554 as the cold storage material continues to unfreeze and provide cooled air through the blower fan to be pushed within the vehicle cabin 140 without consuming an additional amount of energy to power the compressor 126. Specifically, as the compressor 126 remains disabled, the fuel efficiency of the vehicle increases as power from the engine 116 is not utilized to power the compressor 126. Therefore, an extended period of energy efficiency is provided that enhances the efficiency provided by the vehicle idle-state. The cold storage evaporator 136 continues to provide energy efficient cooling until the remaining (frozen) cold storage material has unfrozen (as determined at step 518). In one embodiment, (at step 518) the temperature sensor 130 communicates a rise in temperature within the AC evaporator 138 to the AC control unit 124 and the AC control unit 124 determines when the remaining cold storage material has unfrozen.

At step 522, the compressor 126 is re-enabled by the air conditioner control unit 118 once the remaining cold storage material in the cold storage evaporator is determined to be unfrozen and the cold storage evaporator 136 ceases to provide cooled air to the vehicle cabin 140. At step 524, traditional air conditioned cooling is provided to the vehicle cabin 140 via the AC evaporator 138 (AC evaporator release 556). In an exemplary embodiment, once the vehicle is re-enabled the AC control unit 124 re-determines the vehicle cabin temperature settings at step 502 to restart the compressor efficient control method in order to continually provide enhanced vehicle fuel efficiency.

Furthermore, in some embodiments, the air conditioning compressor efficiency control system 100 can be utilized to provide air conditioning (AC) cooling from the cold storage evaporator 136 to occupants in the vehicle cabin 140 during a vehicle OFF state or a vehicle accessory state, after the vehicle engine has been enabled for a predetermined period of time to allow the sufficient freezing of cold storage material by the AC evaporator 138 when the vehicle is parked.

It will be understood by one of ordinary skill in the art that the systems and methods described herein may be adapted and modified as appropriate for the application being addressed or may be employed in other suitable applications, and that such adaptions and modifications are for purposes of illustrating one or more exemplary embodiments and not for purposes of limiting same. It will also be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for providing an air conditioning compressor efficiency control in a vehicle comprising:
   determining one or more vehicle driving scores based on one or more vehicle driving factors;

predicting when the vehicle will be put into a vehicle idle stop state based on the one or more vehicle driving scores including a vehicle cruise control actuation score that is a summation of the cruise control signal actuation over the course of a predetermined amount of time;

determining an air conditioning operating state based on the prediction of when the vehicle will be put into the vehicle idle state;

providing air conditioning during a plurality of vehicle operating states during at least one of: an engine enabled state and a vehicle idle stop state; and wherein providing air conditioning during a plurality of vehicle operating states includes disabling an air conditioner compressor and providing cooling to a vehicle cabin from a cold storage evaporator when the vehicle operating state is the vehicle idle stop state and continuing to provide cooling to the vehicle cabin from the cold storage evaporator when the vehicle operating state changes from the vehicle idle stop state to the engine enabled state until a sufficient amount of cold storage material remains frozen.

2. The method of claim 1, wherein determining one or more vehicle driving scores includes additionally evaluating at least one of: a vehicle speed, an engine throttle position, and a vehicle brake signal actuation to predict when the vehicle will be put into the vehicle idle stop state.

3. The method of claim 1, wherein determining one or more vehicle driving scores includes evaluating each of the vehicle speed, the engine throttle position, the vehicle brake signal actuation, and the vehicle cruise control actuation.

4. The method of claim 1, wherein predicting when the vehicle will be put into the vehicle idle state includes determining a total driving score and categorizing a driving style profile that is based on at least one of: the vehicle cruise control actuation score, a vehicle speed score that is a rolling average of the vehicle speed over the course of the predetermined time, a vehicle brake signal actuation score that is a rolling summation of the brake signal actuation over the course of the predetermined amount of time, and a vehicle throttle position score that is a rolling average of the position of the vehicle throttle over the course of the predetermined time.

5. The method of claim 4, wherein determining the air conditioning operating state includes selecting at least one of: a traditional operating state, or an AC control efficiency operating state based on one or more of: the total driving score and the driving style profile.

6. The method of claim 1, wherein providing air conditioning during a plurality of vehicle operating states includes freezing a determined volume of cold storage material in a cold storage evaporator when the vehicle operating state is the engine enabled state.

7. The method of claim 6, wherein providing air conditioning during a plurality of vehicle operating states includes enabling an air conditioner compressor and providing cooling to a vehicle cabin from an AC evaporator when the vehicle operating state is the engine enabled state.

8. The method of claim 7, wherein providing air conditioning during a plurality of vehicle operating states includes disabling the air conditioner compressor when the vehicle operating state is the vehicle idle stop state and re-enabling the air conditioner compressor when the vehicle operating state changes from the vehicle idle state to the engine enabled state.

9. A system for providing an air conditioning compressor efficiency control for an air conditioner in a vehicle comprising:

a plurality of modules including a cruise control module for determining one or more driving scores based on one or more vehicle driving factors;

a vehicle idle prediction component for predicting when the vehicle will be put into the vehicle idle stop state based on one or more vehicle driving scores including a vehicle cruise control actuation score determined by the cruise control module that is a rolling summation of the cruise control actuation score over a predetermined amount of time;

an air conditioner control unit that determines an air conditioning operation state based on the prediction of when the vehicle will be put into the vehicle idle state and enables air conditioning to be provided during at least one of an engine enabled state and a vehicle idle stop state; and wherein the air conditioner control unit disables an air conditioner compressor and provides cooling to a vehicle cabin from a cold storage evaporator when the vehicle operating state is the vehicle idle stop state and continues to provide cooling to the vehicle cabin from the cold storage evaporator when the vehicle operating state changes from the vehicle idle stop state to the engine enabled state until a sufficient amount of cold storage material remains frozen.

10. The system of claim 9, wherein the plurality of modules for monitoring one or more vehicle driving factors includes additionally: a vehicle speed module, a throttle position module, and a brake signal module.

11. The system of claim 9, wherein the air conditioner control unit is configured to determine an air conditioning operating state based on at least one of: a total driving score and a driving style profile provided by the vehicle idle prediction component.

12. The system of claim 11, wherein determining the air conditioning operating state includes the air conditioner control unit selecting the air conditioner to be in at least one of: a traditional operating state and an energy efficient operating state based on one or more of: the total driving score and the driving style profile.

13. The system of claim 9, wherein the vehicle idle prediction component is configured to determine a total driving score based on at least one of: the vehicle cruise control actuation score, a vehicle speed score that is a rolling average of the vehicle speed over the course of the predetermined time, an engine throttle position score that is a rolling average of the position of the engine throttle over the course of the predetermined time, and a vehicle brake signal actuation score that is a rolling summation of the brake signal actuation over the predetermined amount of time.

14. The system of claim 13, further comprising a compressor clutch enabling the compressor and an AC evaporator providing cooled air to freeze cold storage material in the cold storage evaporator at a required temperature when the vehicle operating state is in the vehicle functioning state.

15. The system of claim 14, wherein the cold storage evaporator provides cooling when the vehicle operating state is the vehicle idle stop state and an AC evaporator provides cooling when the vehicle operating state changes from the vehicle idle stop state to the engine enabled state.

16. The system of claim 15, wherein the compressor clutch disables the compressor when the vehicle operating state is the vehicle idle stop state, and the compressor clutch enables the compressor when the vehicle operating state changes from the vehicle idle stop state to the vehicle functioning state.

17. The system of claim 14, wherein the cold storage evaporator provides cooling to the vehicle cabin when the vehicle operating state is the vehicle idle stop state, and continues to provide cooling to the vehicle cabin when the vehicle operating state changes from the vehicle idle stop state to the vehicle functioning state, and the AC evaporator provides cooling to the vehicle cabin when the cold storage material in the cold storage evaporator no longer remains frozen and the vehicle is in the vehicle functioning state.

18. The system of claim 17, wherein the compressor clutch enables the air conditioner compressor when the vehicle operating state is the engine enabled state and the cold storage material in the cold storage evaporator no longer remains frozen.

19. A non-transitory computer readable storage medium, storing instructions that when executed by a processor of a computer, causes the processor of the computer to implement a method comprising:

determining one or more vehicle driving scores based on one or more vehicle driving factors;

predicting when the vehicle will be put into a vehicle idle stop state based on the one or more vehicle driving scores including a vehicle cruise control actuation score that is a summation of the cruise control signal actuation over the course of a predetermined amount of time;

determining an air conditioning operating state based on the prediction of when the vehicle will be put into the vehicle idle state;

providing air conditioning during a plurality of vehicle operating states during at least one of: an engine enabled state and a vehicle idle stop state based on the prediction of when the vehicle will be put into the vehicle idle stop state; and wherein providing air conditioning during a plurality of vehicle operating states includes disabling an air conditioner compressor and providing cooling to a vehicle cabin from a cold storage evaporator when the vehicle operating state is the vehicle idle stop state and continuing to provide cooling to the vehicle cabin from the cold storage evaporator when the vehicle operating state changes from the vehicle idle stop state to the engine enabled state until a sufficient amount of cold storage material remains frozen.

* * * * *